T. BLANCHARD.
Grinding Mill.

No. 19,541.

Patented March 9, 1858.

UNITED STATES PATENT OFFICE.

THOMAS BLANCHARD, OF BOSTON, MASSACHUSETTS.

MILL FOR REDUCING SUBSTANCES.

Specification of Letters Patent No. 19,541, dated March 9, 1858.

*To all whom it may concern:*

Be it known that I, THOMAS BLANCHARD, of Boston, in the State of Massachusetts, have invented certain new and useful Improvements in Mills for Reducing Substances; and I do hereby declare that the following is a full, clear, and exact description thereof, reference being had to the accompanying drawings, making part of this specification, in which—

Figure 2:
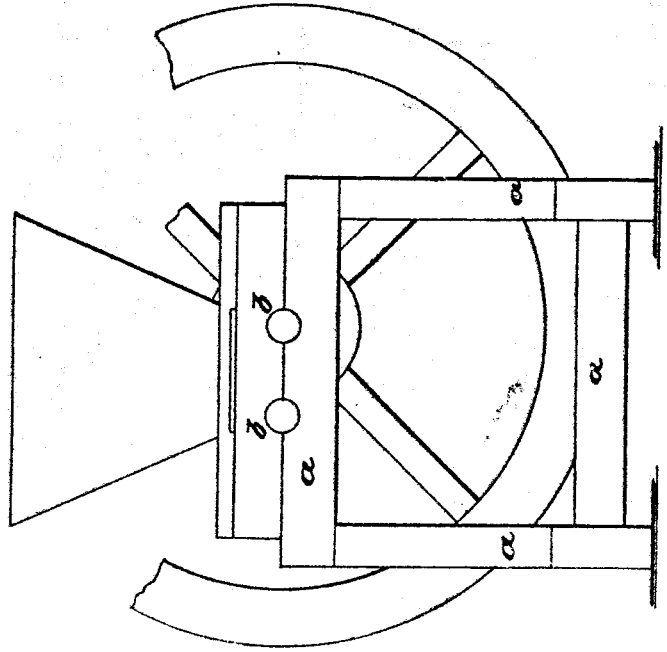
Figure 1:
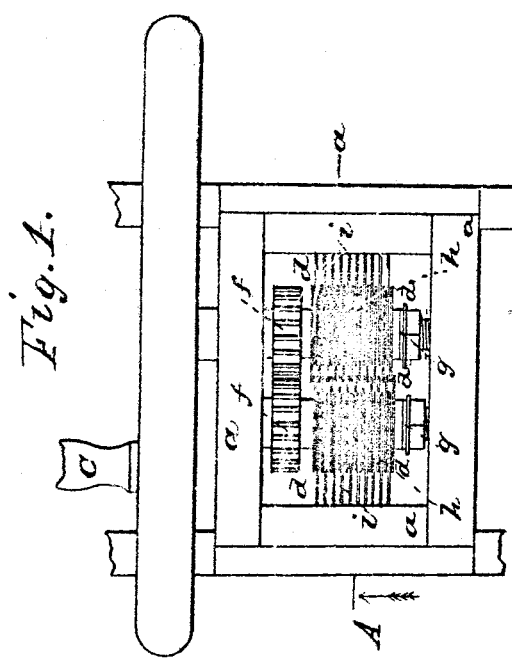
Figure 3:
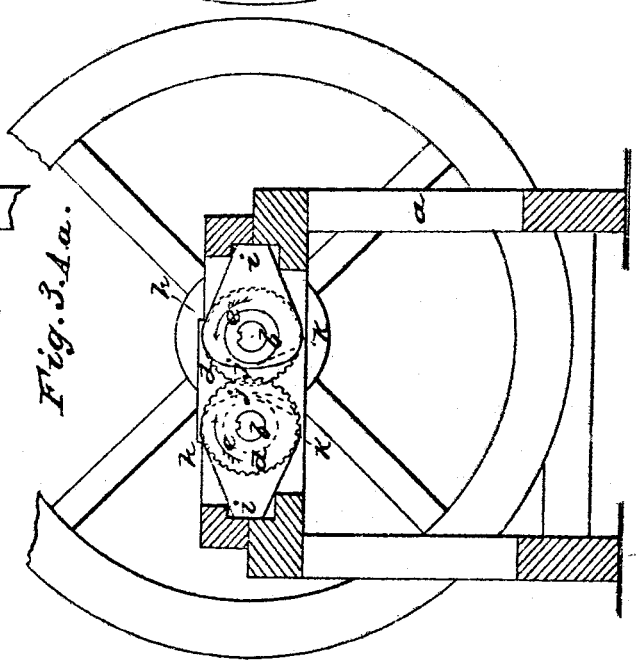

Figure 1 is a plan of the mill with the hopper removed; Fig. 2 a side elevation; and Fig. 3 a vertical section taken at the line A, a of Fig. 1.

The same letters indicate like parts in all the figures.

The object of my invention is to reduce grain into meal or flour, and to reduce other substances, such as have heretofore been generally reduced by grinding or crushing, and to effect this reduction of substances by a shearing action of two series of rotating disks, instead of a grinding, rasping, sawing, or crushing action, whereby I am enabled to obtain better results, as to the quality of the product, and quantity in proportion to the amount of power applied, than by any other known plan, while at the same time the machine is simple, cheap of construction, and not liable to derangement. And in view of the object to be accomplished my said invention consists in the employment in combination with each other, of two series of circular disks, the disks of each series arranged on a separate shaft side by side, with washers of less diameter and of slightly greater thickness interposed, and the two shafts placed parallel with each other and at such distance apart that a portion of the periphery of the disks on each shaft shall pass in the spaces between the disks on the other shaft, the said shafts being geared to rotate in opposite directions and with equal velocity, whereby the peripheries of the two series of disks in their rotation in opposite directions jointly act as a series of continuous shears to sever any material that may be interposed, and reduce it to particles of a size equal to the width of the spaces between any two of the disks. And my said invention also consists in combining with the two series of disks combined as above described, one series of stationary eccentric plates for each series of disks and interposed between the disks, for the purpose of forcing the particles of the reduced substance from between any two of the disks and discharge it at the periphery.

In the accompanying drawings (a) represents a suitable frame, and (b, b) two parallel shafts mounted therein. At one end the two shafts are geared with two spur wheels of equal diameter so that when either of the said shafts is rotated by a crank (c) or by any other suitable means the other shall rotate in the reverse direction and with equal velocity.

On each shaft is mounted a series of circular metallic plates or disks (d) with washers (e) interposed, the central hole in each disk, and each washer being made to fit the shaft accurately, and prevented from turning thereon by a feather or any equivalent means. In mounting the disks and washers. the first disk is slipped onto the shaft against the face of a fixed collar (f), and then a washer, and then a disk, and so on until the required number have been put on, and they are then forced against the fixed collar and bound and held in place by a movable collar (g) tapped onto the shaft, or otherwise secured in any appropriate manner. The disks and washers on each of the two shafts are to be made and mounted in precisely the same manner; but the collars on the two shafts, relatively to the shoulders of the journals are to be so placed that the peripheries of the disks on each shaft shall pass in the spaces between the disks on the other shaft to about the proportional extent represented in the drawings, more or less.

In making the disks and interposed washers care should be taken to have them of uniform thickness, and the washers slightly thicker than the disks to prevent binding as the disks on each shaft move in the space between the disks on the other shaft.

I make two series of plates (h, h) equal in number to the number of washers, and of about the same thickness as the disks. A hole is formed in each of sufficient diameter to fit over the washers (e). These plates, which I term the eccentric clearers, are placed in the spaces between the disks, one over each washer. I prefer to make these plates of the form represented in the drawing with the tail end (i) projecting back of the periphery of the disks for some distance that they may be properly held by the frame as represented, or in any other suitable manner, and the opposite end (*j*) is of an eccentric form so as to leave a considerable space between the periphery of the disks on either shaft and the eccentric edge of the clearers on the other shaft. And the lower edge (*k*) should extend to or beyond the periphery of the disks. The upper edge may be of any form but for convenience I make it, of the same form as the lower edge.

Above the bite of the two series of disks or rolling shears I place any suitable hopper to receive the substances to be reduced and present them to the action of the rolling shears.

If the rolling shears or disks are made of considerable diameter the angle formed by the edges of the two series where, in the rotation they approach each other, will be so acute that the edges will take sufficient hold of the substances to be reduced, but to avoid the necessity of making them of so great a diameter, which would make them too liable to flexure when meeting with unequal lateral resistance, I make notches in their periphery of the form represented or of any other suitable form to take hold of the substances to be reduced and feed them into the bite of the series of rolling shears where, by the rotation in opposite directions, as indicated by arrows they are sheared and reduced to particles of a size depending upon the thickness of the disks, or the space between any two of them. The form of the notches or grooves is not at all material, as the sole object is to present sufficient resistance to prevent the substances from rolling or sliding back when subjected to the shearing action of the oppositely moving shears.

From the foregoing it will be seen that grain (or other substances) being supplied to the hopper and the two series of rotating shears put in motion as described, the grain will be caught between the opposite edges of the two series of disks or rotating shears, and as these gradually approach, each grain will be cut by the shear like action of the edges of the opposite disks precisely in the same manner that any substance is severed by the gradual approach of the opposite edges of shears. And as the two edges of any one disk, acting in conjunction with the inner edges of the opposite disks between which it passes, effect the separation, the grain, or other substances will be thereby separated into particles or fibers of a size equal to the space between any two disks, and if the substances be frangible, as grain, the fibers or lamina will immediately separate in a granular form of a size approximating to the thickness of any of the disks, or what is about the same, the space between any two of the disks. But if the substance to be reduced be not of a frangible nature, and it is to be reduced to a granulated state in some instances it may be necessary to pass it twice through the mill, or through two such mills in succession.

As the particles are thus severed, in many instances they will expand and have a tendency to remain in the space between the disks, but as the disks rotate the particles thus held between them will be gradually brought in contact with the eccentric edges of the clearers which will gradually force them toward and discharge them at the periphery.

In constructing mills on my improved plan the thickness of the plates or disks will have to be governed by the size of the particles to which any desired substance is to be reduced, as such thickness will determine the maximum size of the particles to be produced.

As before intimated the form of the upper part of the eccentric clearers is not material, and in fact may be dispensed with, the portion below the plane of the axes of the two shafts alone being necessary, but it will be found more convenient to make them of the form represented. And instead of curving the edge below the axes of the shafts they may be in a tangent line as represented by dotted lines, or of any other form provided they force the particles gradually toward the periphery of the disks, as otherwise the mill would be liable to choke.

I am aware that it has been proposed to construct mills with two series of circular saws mounted on two parallel shafts, and with washers interposed between the several saws of each series, the teeth of one series of saws working in the spaces between the saws of the other series, and one series rotating with a greater velocity than the other. But the mode of operation of this is entirely different from my said invention as the mechanical action of such a construction is to disintegrate substances by a sawing operation, the teeth on that series of saws which move with the least velocity acting as holders of the substances to be reduced while the teeth on the other series of saws rasp or scrape and finally saw through the said substances, and the product will be essentially saw dust—a result neither contemplated by me, nor produced by my said invention. And such a construction would be attended with a serious inconvenience as the edges of the saw teeth would soon become dull and require to be frequently resharpened. And I am also aware that it has been proposed to construct mills by combining two rollers on parallel shafts, geared to rotate in opposite directions and each with a different velocity; each roller being composed of circular disks or saws with teeth on their peripheries, and the saws of two diameters each small saw interposed between two large ones, and the large saws of each roller working in the spaces between the large saws of the other roller, so that the teeth on the large saws or disks of one roller shall act in conjunction with the teeth on the periphery of the small saws of the other roller to effect the reduction of substances by a combined scraping, or sawing and crushing action, a mode of operation not at all analogous to my said invention. And therefore I do not wish to be understood as claiming broadly the use of two series of circular disks on parallel rotating shafts with the periphery of one series working in the spaces between the disks of the other series except when arranged so as to have a mode of operation such as I have invented and described above.

What I claim as my invention and desire to secure by Letters Patent in the construction of mills for reducing substances is—

1. The employment of two series of rotating shears, constructed substantially as described, combined with each other and with a suitable hopper for the supply of the material to be reduced, and having a mode of operation, substantially such as herein described.

2. And I also claim in combination with the two series of rotating shears for reducing substances, substantially as described, the two series of eccentric clearers, substantially such as described.

THOS. BLANCHARD.

Witnesses:
M. E. HALL,
EDWARD F. HALL.